Patented Feb. 1, 1938

2,106,716

UNITED STATES PATENT OFFICE 2,106,716

SULPHONATED ALKYL-ARYLOXY-ALKYLOLS

Herman A. Bruson, Philadelphia, Pa., assignor to Röhm & Haas Company, Philadelphia, Pa.

No Drawing. Application December 30, 1936, Serial No. 118,267

14 Claims. (Cl. 260—99.12)

This invention relates to products obtained by sulfating and sulfonating ether alcohols of the general formula

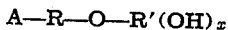

in which A is an alkyl group containing at least eight carbon atoms, R is a benzene or naphthalene nucleus which may have inorganic or organic substituents in addition to that represented by A, R' is a member of the group consisting of alkylene radicals containing at least two carbon atoms and polyalkylene ether radicals in which the alkylene groups contain at least two carbon atoms, and $x$ represents a whole number less than 3.

In the copending application of Bruson and Stein, Serial No. 97,347, filed August 22, 1936, a method is described whereby the hydroxyl groups of the radical R', when it is an alkylene group, may be sulfated to produce the corresponding sulfuric acid esters and their salts. These sulfates are useful as detergents, emulsifying and dispersing agents, etc. for which purposes they give very satisfactory results. It has been found, however, that these products may be improved considerably by the additional introduction of at least one sulfonic acid group into the nucleus represented by R. The products thus obtained are considerably more soluble in water than the simple sulfates, do not precipitate calcium or magnesium salts and may be obtained in the form of dry powders, whereas the simple sulfates when completely dry are wax-like materials which are not as readily incorporated with dry powdery pigments.

The sulfates are prepared by treating the ether alcohols of the above formula with concentrated sulfuric acid (about 100%) at low temperatures. Under these conditions no sulfonation of the aromatic nucleus takes place. In order to introduce the sulfonic acid group into the nucleus, higher temperatures or sulfonating agents stronger than 100% sulfuric acid are required.

The products obtained according to the present invention by introducing both a sulfonic acid group and a sulfuric acid group into the molecule of the ether alcohol are all extremely soluble in water. Most of them can be dissolved in an equal weight of water and the 50% solutions thus obtained are for the most part optically clear. In the form of their water-soluble salts, such as those of the alkali metals, ammonia or amines, they are extremely useful as textile assistants particularly as wetting agents and penetrants. They are also useful as deflocculating or dispersing agents for dyes, pigments, clays, sulfur and other pulverulent materials, as spreading agents for insecticides or oily materials and as leveling agents in dyeing operations. Those members of this group of compounds which contain twelve to eighteen carbon atoms in the radical designated by A are useful as detergents and emulsifying agents. They are very efficient for these purposes under conditions usually obtaining in commercial work because they do not form insoluble salts with the calcium and magnesium found in hard waters.

In practicing this invention, the alkylated aromatic ether alcohol is treated with a sulfonating agent which is stronger than 100% sulfuric acid, such as sulfur trioxide, chlorsulfonic acid or fuming sulfuric acid, preferably at temperatures between 0° and 50° C., the amount of sulfonating agent depending on the number of sulfonic groups to be introduced. Sulfuric acid of about 100% strength can also be used but in order to insure sulfonation of the aromatic nucleus temperatures above about 25° or 30° C. are necessary. At low temperatures, about 10° C. or lower, no sulfonation takes place but the aliphatic hydroxyl group is sulfated. After treatment with the sulfonating agent the product is neutralized with an organic or inorganic base. The most useful bases are the alkali metal hydroxides or carbonates, ammonia, amines, hydroxy alkyl amines, and quaternary ammonium bases. Inert organic solvents can be used to assist solution during the sulfonating step. Examples of such solvents are ethylene dichloride, carbon tetrachloride and petroleum ether.

Typical alkylated aromatic ether alcohols, which give particularly useful products according to this invention are as follows:

p-ter-Octylphenoxyethanol
p-ter-Dodecylphenoxyethanol
p-ter-Hexadecylphenoxyethanol
o- or p-sec-Octylphenoxyethanol
o- or p-n-Dodecylphenoxyethanol
o- or p-n-Octadecylphenoxyethanol
ter-Octyl-β-naphthoxyethanol
p-ter-Octylphenoxypropanol-1
p-ter-Octylphenoxybutanol-1
p-ter-Octylphenoxy-propane diol-1,2

The aromatic nucleus R can contain additional nuclear substituents, such as halogen, nitro, acyl, alkyl, aralkyl, cyclo-alkyl, or aryl groups.

For example, p-ter-octyl-o-chlorphenoxyethanol, p-ter-octyl-o-cresyloxyethanol, p-nitro-o-sec-octylphenoxypropanol-1, p-ter-octyl-o-acetyl-phenoxyethanol, p-ter-octyl-o-benzylphenoxyethanol, p-ter-dodecyl-o-cyclohexyl-phenoxyethanol, p-ter-octyl-o-phenylphenoxyethanol, etc. can be used.

The following examples are given to illustrate the invention. It is not, however, limited to the exact reagents, time, temperature and conditions of operation shown as it may otherwise be practiced within the scope of the appended claims.

*Example 1*

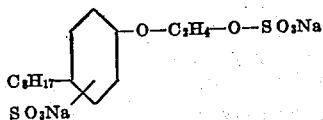

250 g. of p-α,α,γ,γ-tetramethylbutylphenoxyethanol (1 mol.) is cooled to 5° C. and stirred, while 235 g. of chlorosulfonic acid (2 mols) is gradually added, so that the temperature does not rise above 20° C. The mixture is stirred at 5° to 10° C. for about four hours after all the acid has been added, and is then allowed to come to room temperature. The thick, red sirup obtained is run onto ice and neutralized with 10% caustic soda solution to pH 8. The clear, pale yellow, foamy, soapy solution obtained is a very powerful penetrating agent. In its acidic form it has the probable formula

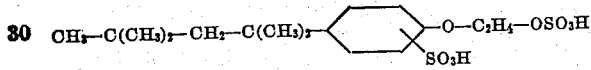

Instead of caustic soda, one may use caustic potash, ammonium hydroxide, a methylamine, mono-, di- or triethanolamine or other water-soluble base to neutralize the product. The solutions obtained are useful as deflocculating agents for colloidal sulfur, zinc oxide, and other pigments. The water can be evaporated to leave the products as a solid mass soluble in water.

Instead of the ter-octylphenoxyethanol, 250 g. of o-sec-octylphenoxyethanol or p-n-octylphenoxyethanol may be used.

These ether alcohols are obtained by condensing ethylene chlorohydrin or ethylene oxide with the respective octylphenols in the presence of alkali, as described in copending application Serial No. 755,358, filed November 30, 1934.

*Example 2*

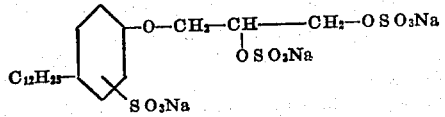

168 g. of p-ter-dodecylphenoxypropane-diol-1,2 (0.5 mol.) was dissolved in 300 cc. of ethylene dichloride, and a stream of sulfur trioxide passed in at 0° to 5° C. until the gain in weight amounted to 120 g. (1.5 mols). The mixture was poured on ice and neutralized with 10% caustic soda solution. The clear solution obtained is useful as a penetrant or wetting agent.

In place of the ter-dodecylphenoxypropane-diol-1,2, the corresponding o- or p-sec-dodecylphenoxypropane-diol, or n-dodecylphenoxypropane-diol-1,2 may be used.

These ether alcohols are obtained by condensing glycerol monochlorohydrin with the dodecylphenol in the presence of excess caustic soda. The ter-dodecylphenol is obtained by condensing phenol with tri-isobutylene in the presence of concentrated sulfuric acid as a condensing agent. The o- and p-dodecylphenols are obtained by heating lauryl alcohol with excess phenol at 180° to 190° C. for several hours with anhydrous zinc chloride.

*Example 3*

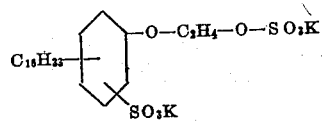

181 g. of hexadecylphenoxyethanol (0.5 mol.) was treated with 118 g. of chlorosulfonic acid (1 mol.) at 0° to 5° C., as described in Example 1. The product was neutralized with dilute potassium hydroxide solution. The product was a very foamy, soapy solution, useful as a detergent. The sodium and ammonium salts are similar in character.

The hexadecylphenoxyethanol was derived by condensing cetyl alcohol with phenol and zinc chloride at 190° to 200° C. and reacting upon the distilled product with excess caustic soda and ethylene chlorohydrin in alcoholic solution.

*Example 4*

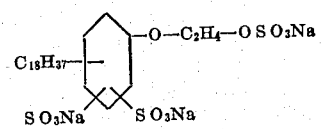

195 g. of octadecylphenoxyethanol (0.5 mol.) was treated at 0° to 5° C. with 180 g. of chlorosulfonic acid, as described in Example 1. The red mass obtained was allowed to stand 24 hours at 10° to 15° C. It was then neutralized with dilute sodium hydroxide solution at 10° to 15° C. The pale reddish solution obtained is useful as a detergent or emulsifying agent.

*Example 5*

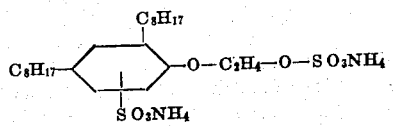

A mixture of 1 mol. of phenol and 2 mols of diisobutylene was treated with 0.2 mol. of concentrated sulfuric acid at 25° to 30° C. for 24 hours. The oil obtained was boiled with water containing sufficient caustic soda to just neutralize the free acid, and the oil layer distilled in vacuo over a small amount of soda. The di-ter-octylphenol distilled over at 170° to 200° C./3 mm. as a heavy oil. This was converted to di-ter-octylphenoxyethanol (b. p. 160° to 215° C./1 mm.) by heating in alcohol with excess caustic soda and ethylene chlorohydrin.

181 g. of di-ter-octylphenoxyethanol (0.5 mol.) was mixed with 150 g. of fuming sulfuric acid (10% SO₃) at 15° to 20° C., and stirred for eight hours. The mixture was poured on ice and neutralized with ammonium hydroxide. The solution obtained is useful as a wetting agent.

*Example 6*

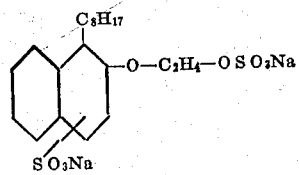

150 g. of ter-octyl-β-naphthoxyethanol (0.5 mol.) were treated with 120 g. of chlorosulfonic acid at 5° to 10° C. for four hours, then poured on ice and neutralized with caustic soda solution.

The water was removed by evaporation, leaving a cream-colored powder whose aqueous solutions have a powerful penetrative action on cotton.

Example 7

$$C_{12}H_{25}\text{—}\underset{SO_3Na}{\underset{|}{\bigcirc}}\text{—}O\text{—}C_2H_4\text{—}O\text{—}SO_3Na$$

To 153 g. of dodecylphenoxyethanol (0.5 mol.) there were added, while stirring, 118 g. of chlorosulfonic acid, at a temperature between 0° and 10° C. The mixture was stirred eight hours at this temperature and then allowed to come to room temperature. It was poured on ice after three hours' standing at room temperature, and the mixture neutralized to pH 8 with 10% caustic soda solution. The solution obtained is useful as a detergent.

In a similar manner, tetradecylphenoxyethanol can be employed.

The sulfonation products described in the foregoing examples can be employed in acid or alkaline solution.

The specific ether alcohols employed in the foregoing examples can be replaced mol. for mol. by any of the analogous ether alcohols heretofore mentioned, or by mixtures thereof, or similar alcohol ethers in which R' of the generic formula above-shown may consist of a polyalkylene ether group such as the β-mono(α,α,γ,γ-tetramethylbutylphenyl) ether of di- or triethylene glycol, etc. Ethers of this type can be prepared by heating the corresponding alkylated phenols having at least eight carbon atoms in the alkyl substituent, with β-chloro-β'-hydroxydiethyl ether or β-chloro-ethoxy-β'-hydroxydiethyl ether respectively and caustic soda; or they may be prepared by the hydrolysis of the corresponding β(alkylphenoxyalkoxy)-β'-chloropolyalkyl ethers.

Example 8

29.4 g. of β(p-α,α,γ,γ-tetramethylbutylphenoxy)-β'-hydroxydiethyl ether $$CH_3\text{-}C(CH_3)_2\text{-}CH_2\text{-}C(CH_3)_2\text{-}\bigcirc\text{-}O\text{-}C_2H_4\text{-}O\text{-}C_2H_4OH$$

were dissolved in 30 cc. of carbon tetrachloride and to the solution there were added at 10° to 20° C. 24 g. of chlorosulfonic acid. After stirring for five hours at 20° to 25° C., the solution was neutralized at 10° C. with ice-cold 10% caustic soda solution and the solvent and water removed by evaporation. The product was a water-soluble powder corresponding to the formula $$C_8H_{17}\text{—}\underset{SO_3Na}{\underset{|}{\bigcirc}}\text{—}O\text{—}C_2H\text{—}O\text{—}C_2H_4\text{—}O\,SO_3Na$$

In a similar manner β(p-α,α,γ,γ-tetramethylbutylphenoxy ethoxy)-β'-hydroxydiethyl ether can be sulfonated with two mols of sulfur trioxide or chlorosulfonic acid to yield the corresponding disulfonate, having in the acidic form the formula $$CH_3\text{-}C(CH_3)_2\text{-}CH_2\text{-}C(CH_3)_2\text{-}\underset{SO_3H}{\underset{|}{\bigcirc}}\text{-}O\text{-}C_2H_4\text{-}O\text{-}C_2H_4\text{-}O\text{-}C_2H_4\text{-}O\,SO_3H$$

Its sodium, potassium or ammonium salts are extremely water-soluble white powders.

The tertiary octylphenoxy groups of the polyalkylene ether alcohols used in the foregoing example can be replaced by any of the alkyl substituted aryloxy groups herein mentioned.

The products containing both sulfonic and sulfuric groups described herein possess much greater solubility in water than the corresponding simple sulfates having the same number of aliphatic carbon atoms in the chain. Because of their high degree of water-solubility, these new compounds are effective in many cases at lower concentrations than the present commercial alkyl sulfates or sulfonates having from eight to eighteen carbon atoms in the chain.

I claim:

1. A compound having the formula $$C_8H_{17}\text{—}\underset{SO_3Na}{\underset{|}{\bigcirc}}\text{—}O\text{—}C_2H_4\text{—}OSO_3Na$$

2. A compound having the general formula $$A\text{—}\underset{SO_3M}{\underset{|}{\bigcirc}}\text{—}O\text{—}C_2H_4\text{—}OSO_3M$$

in which A is an alkyl group containing from eight to eighteen carbon atoms inclusive and M is a member of the group consisting of hydrogen, alkali metals, ammonium and substituted ammonium radicals.

3. A compound having the general formula $$A\text{—}R\underset{SO_3M}{\overset{|}{\text{———}}}O\text{—}C_2H_4\text{—}O\text{—}SO_3M$$

in which A is an alkyl group containing from eight to eighteen carbon atoms inclusive, R is one of the group consisting of benzene and naphthalene nuclei and M is a member of the group consisting of hydrogen, alkali metals, ammonium and substituted ammonium radicals.

4. A compound having the general formula $$A\text{—}R\underset{SO_3M}{\overset{|}{\text{———}}}O\text{—}C_2H_4\text{—}O\text{—}SO_3M$$

in which A is an alkyl group containing at least eight carbon atoms, R is one of the group consisting of benzene and naphthalene nuclei and M is a member of the group consisting of hydrogen, alkali metals, ammonium and substituted ammonium radicals.

5. A compound of the general formula $$A\text{—}R\underset{(SO_3M)_y}{\overset{|}{\text{———}}}O\text{—}R'(OSO_3M)_x$$

in which A is an alkyl group containing from eight to eighteen carbon atoms inclusive, R is one of the group consisting of benzene and naphthalene nuclei, R' is a member of the group consisting of alkylene radicals containing at least two carbon atoms and polyalkylene ether radicals in which the alkylene groups contain at least two carbon atoms, M is a member of the group consisting of hydrogen, alkali metals, ammonium and substituted ammonium radicals, and $x$ and $y$ each have the value of one or two.

6. A compound of the general formula $$A\text{—}R\underset{(SO_3M)_y}{\overset{|}{\text{———}}}O\text{—}R'(OSO_3M)_x$$

in which A is an alkyl group containing at least eight carbon atoms, R is one of the group consisting of benzene and naphthalene nuclei, R' is a member of the group consisting of alkylene radicals containing at least two carbon atoms and polyalkylene ether radicals in which the alkylene groups contain at least two carbon atoms, M is a member of the group consisting of hydrogen, alkali metals, ammonium and substituted ammonium radicals, and $x$ and $y$ each have the value of one or two.

7. The process of preparing a compound of the formula

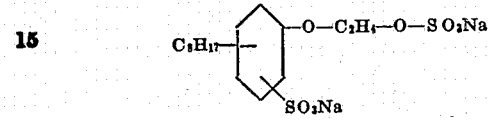

which comprises treating one mol. of an octylphenoxy ethanol with two mols of a sulfonating agent and neutralizing the reaction product with sodium hydroxide.

8. The process of producing a compound which in the acidic form has the general formula

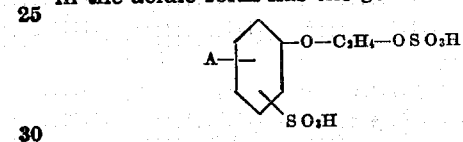

in which A is an alkyl group containing from eight to eighteen carbon atoms inclusive, which comprises treating one mol. of an alkylated phenoxyethanol A—C₆H₄—O—C₂H₄OH with two mols of a sulfonating agent and neutralizing the product with a water-soluble base.

9. The process of preparing compounds which in the acidic form have the general formula

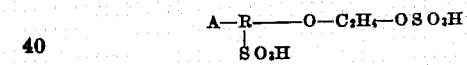

in which A is an alkyl radical containing from eight to eighteen carbon atoms inclusive, and R is a member of the group consisting of benzene and naphthalene nuclei, which comprises treating one mol. of the alkylaryloxy ethanol $$A—R—O—C_2H_4OH$$

with two mols of a sulfonating agent.

10. The process of preparing compounds which in the acidic form have the general formula

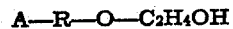

in which A is an alkyl radical containing at least eight carbon atoms, and R is a member of the group consisting of benzene and naphthalene nuclei, which comprises treating one mol. of the alkylaryloxy ethanol A—R—O—C₂H₄OH with two mols of of a sulfonating agent.

11. The process of preparing compounds which in the acidic form have the general formula

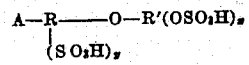

in which A is an alkyl radical containing from eight to eighteen carbon atoms inclusive, R is a member of the group consisting of benzene and naphthalene nuclei, R' is a member of the group consisting of alkylene radicals containing at least two carbon atoms and polyalkylene ether radicals in which the alkylene groups contain at least two carbon atoms, and $x$ and $y$ each have the value one or two, which comprises treating one mol. of an alkylated phenoxy alkylol A—R—O—R'(OH)$_x$ with $(x+y)$ mols of a sulfonating agent, and neutralizing the product with a water-soluble base.

12. The process of preparing compounds which in the acidic form have the general formula

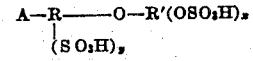

in which A is an alkyl radical containing at least eight carbon atoms, R is a member of the group consisting of benzene and naphthalene nuclei, R' is a member of the group consisting of alkylene radicals containing at least two carbon atoms and polyalkylene ether radicals in which the alkylene groups contain at least two carbon atoms, and $x$ and $y$ each have the value one or two, which comprises treating one mol. of an alkylated phenoxy alkylol A—R—O—R'(OH)$_x$ with $(x+y)$ mols of a sulfonating agent, and neutralizing the product with a water-soluble base.

13. A compound having the formula

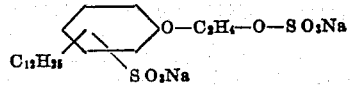

14. A compound having the formula

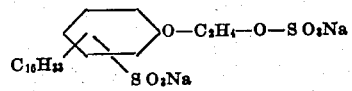

HERMAN A. BRUSON.